United States Patent
Shinagawa et al.

(10) Patent No.: US 11,816,523 B2
(45) Date of Patent: Nov. 14, 2023

(54) RF TAG AND RF TAG-EQUIPPED CONDUCTOR

(71) Applicant: PHOENIX SOLUTION CO., LTD., Kanazawa (JP)

(72) Inventors: Satoshi Shinagawa, Kanazawa (JP); Masakazu Fujii, Kanazawa (JP)

(73) Assignee: PHOENIX SOLUTION CO., LTD., Ishikawa (JP)

( * ) Notice: Subject to any disclaimer, the term of this patent is extended or adjusted under 35 U.S.C. 154(b) by 241 days.

(21) Appl. No.: 17/436,173

(22) PCT Filed: Feb. 12, 2020

(86) PCT No.: PCT/JP2020/005261
§ 371 (c)(1),
(2) Date: Sep. 3, 2021

(87) PCT Pub. No.: WO2020/179381
PCT Pub. Date: Sep. 10, 2020

(65) Prior Publication Data
US 2022/0129722 A1    Apr. 28, 2022

(30) Foreign Application Priority Data
Mar. 7, 2019 (JP) .................. 2019-041516

(51) Int. Cl.
*G06K 19/06* (2006.01)
*G06K 19/077* (2006.01)
(Continued)

(52) U.S. Cl.
CPC . *G06K 19/07773* (2013.01); *G06K 19/07771* (2013.01); *H01Q 1/2225* (2013.01);
(Continued)

(58) Field of Classification Search
CPC ...... G06K 19/077; G06Q 10/00; G06Q 10/06; G06Q 10/10; H01Q 1/22; H01Q 1/38;
(Continued)

(56) References Cited

U.S. PATENT DOCUMENTS

| 10,763,566 | B2 * | 9/2020 | Noori | .................. | H01Q 9/0414 |
| 2002/0190909 | A1 * | 12/2002 | Yamamoto | ............. | H01Q 5/371 |
| | | | | | 343/742 |

(Continued)

FOREIGN PATENT DOCUMENTS

| JP | 2005-191705 A | 7/2005 |
| JP | 2008-140400 A | 6/2008 |

(Continued)

OTHER PUBLICATIONS

International Search Report issued in Patent Application No. PCT/JP2020/005261 dated May 12, 2020.

*Primary Examiner* — Thien M Le
(74) *Attorney, Agent, or Firm* — PEARNE & GORDON LLP

(57) ABSTRACT

An RF tag includes an RF tag antenna and an IC chip. The RF tag antenna is provided with: an insulation base material having a first main surface, a second main surface, and a first lateral surface; a first waveguide element provided on the first main surface; a second waveguide element provided to extend from the second main surface to the first lateral surface and the first main surface; and a power supply part and a short circuiting part that are provided on the first main surface. A planar inverted-F antenna is formed from the insulation base material, the first waveguide element, the second waveguide element, the power supply part, and the short circuiting part. The lengths of the power supply part and the short circuiting part are set such that the resonant frequency of an LC resonant circuit coincides with the reception frequency of radio waves.

7 Claims, 4 Drawing Sheets

(51) Int. Cl.
*H01Q 1/22* (2006.01)
*H01Q 1/38* (2006.01)
*H01Q 9/04* (2006.01)
*H01Q 13/08* (2006.01)

(52) U.S. Cl.
CPC .............. *H01Q 1/38* (2013.01); *H01Q 9/0421* (2013.01); *H01Q 13/08* (2013.01)

(58) Field of Classification Search
CPC ............ H01Q 13/08; H01Q 9/04; H01Q 1/40; H01Q 9/42; G05B 19/418; G06F 15/02; G06F 9/46
See application file for complete search history.

(56) References Cited

U.S. PATENT DOCUMENTS

| | | | |
|---|---|---|---|
| 2006/0061510 A1* | 3/2006 | Itsuji | H01Q 9/28 |
| | | | 343/786 |
| 2007/0001910 A1* | 1/2007 | Yamanaka | H01Q 13/02 |
| | | | 343/700 MS |
| 2007/0115181 A1* | 5/2007 | Park | H01Q 9/42 |
| | | | 343/700 MS |
| 2009/0195459 A1* | 8/2009 | Chua | H01Q 9/04 |
| | | | 343/700 MS |
| 2011/0170267 A1* | 7/2011 | Ando | H01Q 15/14 |
| | | | 174/126.1 |
| 2012/0013469 A1 | 1/2012 | Kai et al. | |
| 2018/0032853 A1 | 2/2018 | Sugimura et al. | |
| 2019/0196107 A1* | 6/2019 | Sakr | H01Q 19/136 |
| 2020/0091608 A1* | 3/2020 | Alpman | H01Q 25/001 |
| 2020/0300901 A1* | 9/2020 | Murata | G01R 29/0885 |
| 2020/0365967 A1* | 11/2020 | Sugimura | H01Q 7/00 |
| 2021/0341568 A1* | 11/2021 | Hitzler | H01Q 1/2283 |

FOREIGN PATENT DOCUMENTS

| | | |
|---|---|---|
| JP | 2009-231870 A | 10/2009 |
| JP | 2011-211748 A | 10/2011 |
| JP | 2012-023689 A | 2/2012 |
| JP | 5703977 B2 | 4/2015 |
| WO | 2016/129542 A1 | 8/2016 |

* cited by examiner

RF TAG AND RF TAG-EQUIPPED CONDUCTOR

TECHNICAL FIELD

The present invention relates to an RF tag and an RF tag-equipped conductor, and more specifically, to a small and thin RF tag.

BACKGROUND ART

In recent years, RFID systems using RFID (Radio Frequency Identification) are under consideration in various fields such as physical distribution.

An RFID system uses an RF tag provided with an antenna and an IC chip. An RF tag receives a radio wave (carrier) transmitted from an antenna of a reading device by an antenna of the RF tag. The RF tag sends back identification data or the like of a transported object recorded in the IC chip to the reading device with the data carried on a reflected wave. This allows the RF tag to communicate with the reading device without touching the reading device to the RF tag. Note that some reading devices have a writing function to write information to the RF tag.

Patent Literature 1 (WO2016/129542) describes an RF tag antenna provided with: a first insulation base material with a first main surface and a second main surface; a first waveguide element provided on the first main surface; a second waveguide element provided on the second main surface; a power supply part, one end of which is electrically connected to the second waveguide element; and a short circuiting part, one end of which is electrically connected to the first waveguide element and the other end of which is electrically connected to the second waveguide element, wherein the first insulation base material, the first waveguide element, the second waveguide element, the power supply part and the short circuiting part constitute a planar inverted F antenna that receives a radio wave transmitted from a reading device; and an inductor pattern L constructed of the first waveguide element, the short circuiting part, the second waveguide element and the power supply part and a capacitor constructed of the first waveguide element, the second waveguide element and the first insulation base material constitute a resonance circuit that resonates in a frequency band of a radio wave.

Patent Literature 2 (Japanese Patent Publication No. 5703977) describes a metal article with a radio communication device provided with an inverted F type antenna, constructed of: a dielectric block having a first main surface and a second main surface facing the first main surface; a radiation conductor provided on the first main surface of the dielectric block; a ground conductor provided on the second main surface of the dielectric block; a power supply conductor that connects a radio IC element that processes a high frequency signal and the radiation conductor and the ground conductor; and a short circuit conductor that connects the radiation conductor and the ground conductor, wherein at least the radiation conductor, the ground conductor, the power supply conductor and the short circuit conductor are respectively configured as sheet-shaped metal conductors, among the metal conductors, that of the radiation conductor is disposed on the first main surface of the dielectric block, that of the ground conductor is disposed on the second main surface of the dielectric block, that of the power supply conductor is mainly disposed on a lateral surface of the dielectric block, that of the short circuit conductor is mainly disposed on a lateral surface of the dielectric block, and the ground conductor and the metal article are electrically connected directly or via a capacitance and the metal article is used as a radiation element.

CITATION LIST

Patent Literature

Patent Literature 1: Domestic re-publication of PCT international publication WO2016/129542(A1)
Patent Literature 2: Japanese Patent Publication No. 5703977

SUMMARY OF INVENTION

Technical Problem

According to the invention described in Patent Literature 1, the power supply part and the short circuiting part are provided on a lateral surface of the first insulation base material, and as described in FIG. 1A, even when the IC chip is provided on the same plane as the plane of the first waveguide element, the lengths of the short circuiting part of the antenna and the power supply part are substantially equal to the thickness of the first insulation base material.

Therefore, the inductance of the inductor pattern constructed of the first waveguide element, the short circuiting part, the second waveguide element and the power supply part is determined by the thickness of the first insulation base material and the shapes of the first and second waveguide elements, and the inductance value cannot be set freely.

According to the invention described in Patent Literature 2, the power supply conductor, the short circuit conductor and the radio IC element are disposed on a lateral surface of the dielectric block, and as described in FIG. 9B, the lengths of the power supply conductor and the short circuit conductor are substantially equal to the thickness of the dielectric block including the case where the radio IC element is disposed on the top surface.

It is a main object of the present invention to provide a planar inverted-F antenna type small and thin RF tag provided with a resonance frequency tuned to a reception frequency of a radio wave, and an RF tag-equipped conductor provided with such an RF tag and such a conductor.

(1) An RF tag according to an aspect is an RF tag including an RF tag antenna and an IC chip that operates based on a radio wave, the RF tag antenna including: an insulation base material having a first main surface, a second main surface facing the first main surface, a first lateral surface adjacent to the first main surface and the second main surface; a first waveguide element provided on the first main surface; a second waveguide element provided so as to extend from the second main surface to the first lateral surface and the first main surface; a power supply part provided on the first main surface, one end of which is electrically connected to the first waveguide element and the other end of which is electrically connected to the second waveguide element and mounted with the IC chip; and a short circuiting part provided on the first main surface, one end of which is electrically connected to the first waveguide element and the other end of which is electrically connected to the second waveguide element, wherein the insulation base material, the first waveguide element, the second waveguide element, the power supply part and the short circuiting part constitute a planar inverted-F antenna that receives the radio wave transmitted from a reading device; the total length of the lateral sides of the first waveguide element (hereinafter also referred to as a "perimeter length") is 20% or more and 30% or less of a wavelength (λ) of the radio wave; and an inductance (L) constructed of the first waveguide element, the short circuiting part, the second waveguide element and the power supply part, and a capacitance (C) that is the sum of a capacitance of a capacitor constructed of the first waveguide element, the second waveguide element and the insulation base material and an equivalent capacitance in the IC chip, constitute a resonance circuit that resonates at a frequency (f) of the radio wave, and the lengths of the power supply part and the short circuiting part are set so that the inductance (L) satisfies:

$$f = \frac{1}{2\pi\sqrt{LC}} \qquad \text{[Equation 1]}$$

To reduce the size of the RF tag antenna shape, the total length of the lateral sides of the first waveguide element needs to be shortened. However, according to the design technique of the conventional planar inverted-F antenna, the total length of the lateral sides of the first waveguide element is (½)λ where the wavelength is assumed to be λ, and it is difficult to make the total length of the lateral sides shorter than (½)λ.

The inventor disclosed that an inductor pattern constructed of the first waveguide element, the short circuiting part, the second waveguide element and the power supply part, and a capacitor constructed of the first waveguide element, the second waveguide element and the insulation base material constitute a resonance circuit resonating in a frequency band of a radio wave, that is, if the frequency of the resonance circuit is set to the frequency of a radio wave, it is possible to receive a radio wave even when the total length of the lateral sides of the first waveguide element is less than (½)λ. However, when the total length of the lateral sides of the first waveguide element is shortened, the capacitance of the capacitor constructed of the first waveguide element, the second waveguide element and the insulation base material is reduced and the resonance frequency of the resonance circuit described in the above-described disclosure becomes higher than the reception frequency of a radio wave. It may be possible to reduce the distance between the first main surface and the second main surface, that is, reduce the thickness of the insulation base material and increase the capacitance to thereby tune the resonance frequency to the reception frequency of a radio wave. However, in this case, the area of the opening between the first waveguide element and the second waveguide element becomes smaller, resulting in a problem that the gain of the RF tag antenna becomes smaller, or extremely reducing the thickness of the insulation base material may result in a problem that mechanical strength of the insulation base material is weakened.

The invention according to the one aspect implements a small and thin RF tag provided with a resonance frequency tuned to a reception frequency of a radio wave without extremely reducing the thickness of the insulation base material by providing the power supply part and the short circuiting part on the first main surface, thereby securing a degree of freedom in shape and length in particular of the power supply part and the short circuiting part, and setting the lengths of the power supply part and the short circuiting part so as to satisfy the above-described Equation 1.

Note that in the invention according to the one aspect, the second waveguide element is provided so as to extend from the second main surface to the first lateral surface and the first main surface, and this is intended to facilitate a pasting operation by covering the first lateral surface not with the power supply part and the short circuiting part but with the second waveguide element.

(2) An RF tag according to a second invention is the RF tag according to the one aspect, in which the insulation base material has a rectangular parallelepiped shape having long sides, short sides and a height, the first lateral surface is a lateral surface of the insulation base material on a short-side side, a notch is formed on the first main surface from the center of the short side along a longitudinal direction of the rectangular parallelepiped, and the power supply part and the short circuiting part are separated by the notch.

In this case, by forming the notch on the first main surface from the center of the short side along the longitudinal direction of the rectangular parallelepiped and separating the power supply part and the short circuiting part by the notch, it is possible to secure a wider degree of freedom in shape (length and width) of the power supply part and the short circuiting part.

(3) An RF tag according to a third invention is the RF tag according to the one aspect and the second invention, in which the raw material of the insulation base material is Styrofoam.

Using Styrofoam having a small relative permittivity as the insulation base material makes it possible to increase the distance between the first waveguide element and the second waveguide element with respect to the same capacitance and ensure the area of the opening of the antenna and thereby improve the gain of the planar inverted-F antenna.

(4) An RF tag according to a fourth invention is the RF tag according to the one aspect to the third invention, in which a protection and printing sheet is provided on the surfaces of the first waveguide element, the second waveguide element, the power supply part and the short circuiting part, and further, an adhesive sheet is provided on the surface of protection and printing sheet of the second main surface.

In this case, providing the protection and printing sheets on the surfaces of the first waveguide element, the second waveguide element, the power supply part and the short circuiting part makes it possible to protect the RF tag antenna and print a product name or the like, and further, providing the adhesive sheet on the second main surface facilitates adhesion of the RF tag to the conductor or the like.

(5) An RF tag according to a fifth invention is the RF tag according to the one aspect to the third invention, in which a protection and printing sheet is provided on the surfaces of the first waveguide element, the power supply part and the short circuiting part of the first main surface, an exterior sheet is provided on the surface of the protection and printing sheet of the first main surface and each lateral surface of the insulation base material, and further, an adhesive sheet is provided on the surface of the second waveguide element of the second main surface.

In this case, providing the protection and printing sheet on the surfaces of the first waveguide element of the first main surface, the power supply part and the short circuiting part makes it possible to protect the RF tag antenna and print the product name or the like, and providing the exterior sheet on the first main surface and the lateral surfaces of the RF tag makes the RF tag waterproof, and further, providing the adhesive sheet on the second main surface facilitates adhesion of the RF tag to the conductor or the like.

(6) An RF tag according to a sixth invention is the RF tag according to the one aspect to the third invention, in which a protection and printing sheet is provided on the surfaces of the first waveguide element, the power supply part and the short circuiting part of the first main surface, an exterior sheet is provided on the surface of the protection and printing sheet of the first main surface, each lateral surface of the insulation base material and the surface of the second waveguide element of the second main surface, and further, an adhesive sheet is provided on the surface of the exterior sheet of the second main surface.

In this case, providing the protection and printing sheet on the surfaces of the first waveguide element of the first main surface, the power supply part and the short circuiting part makes it possible to protect the RF tag antenna and print the product name or the like, and covering all the first main surface of the insulation base material, the second main surface and each lateral surface with the exterior sheet makes the RF tag waterproof, strengthens weather resistance, and further, providing the adhesive sheet on the surface of the exterior sheet of the second main surface facilitates adhesion of the RF tag to the conductor or the like.

(7) An RF tag-equipped conductor according to a seventh invention includes a conductor and the RF tag according to the fourth invention to the sixth invention, in which the conductor is attached to the RF tag via the adhesive sheet of the RF tag.

In this case, the conductor and the second waveguide element of the RF tag are connected via a capacitance of the adhesive sheet or the like, the conductor functions as an extension of the second waveguide element of the RF tag, becoming substantially equivalent to the RF tag antenna having a large area of the second waveguide element. By increasing the area of the second waveguide element (corresponding to the ground section or housing of the antenna) of the RF tag antenna, it is possible to improve the antenna gain.

DESCRIPTION OF EMBODIMENTS

Figure 1:
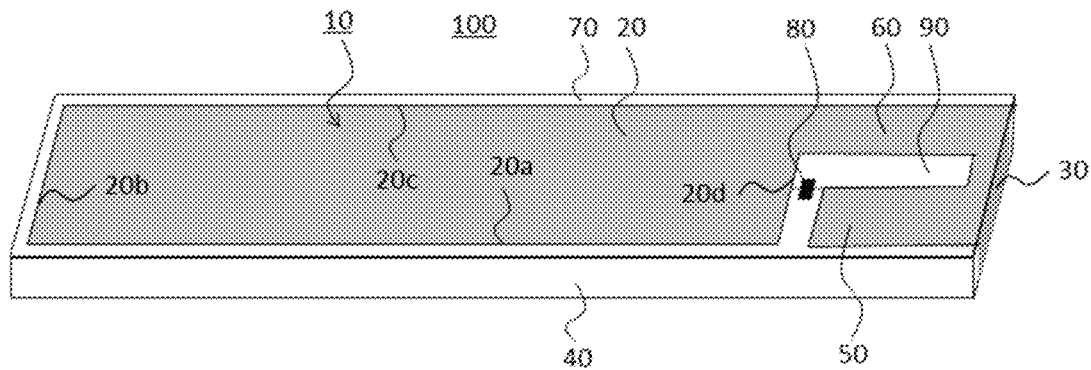
FIG. 1 is a schematic perspective view seen from a first main surface side of an RF tag of a first embodiment.

Hereinafter, embodiments of the present invention will be described with reference to the accompanying drawings. In the following description, the same parts are assigned the same reference numerals. When the same reference numerals are assigned, their names and functions are also the same. Therefore, detailed description thereof will not be repeated.

First Embodiment

Figure 2:
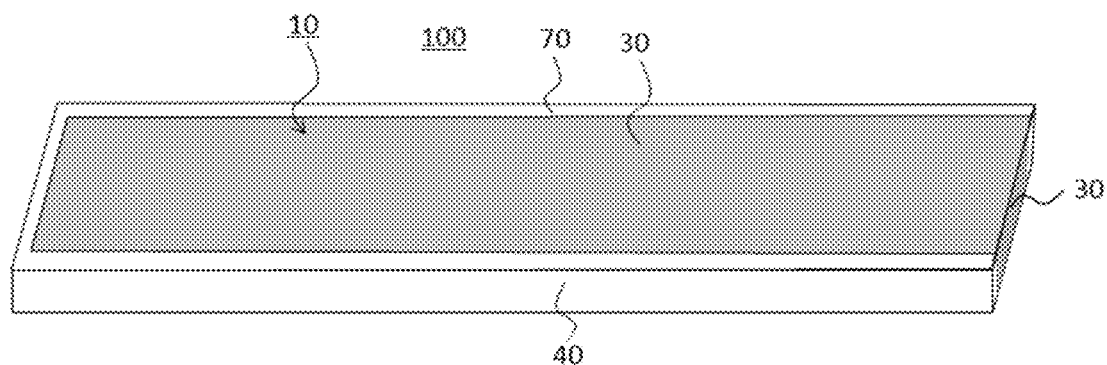
FIG. 2 is a schematic perspective view seen from a second main surface side of the RF tag of the first embodiment.
Figure 3:
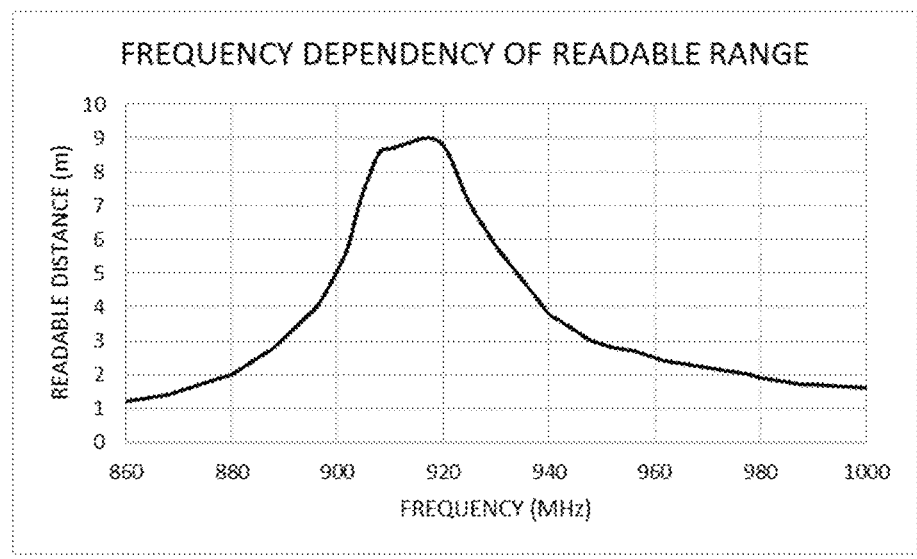
FIG. 3 is a graph of measured values of frequency characteristics in a readable range of the RF tag of the first embodiment.

FIG. 1 is a schematic perspective view seen from a first main surface side of an RF tag 100 of a first embodiment, FIG. 2 is a schematic perspective view seen from a second main surface side of the RF tag 100 of the first embodiment, FIG. 3 is a graph of measured values of frequency characteristics in a readable range of the RF tag 100 of the first embodiment.

(Shape of RF Tag 100)

The RF tag 100 of the first embodiment is provided with an RF tag antenna 10 and an IC chip 80. The RF tag antenna 10 is provided with an insulation base material 40, a first waveguide element 20, a second waveguide element 30, a power supply part 50 and a short circuiting part 60.

The insulation base material 40 includes a first main surface, a second main surface and a first lateral surface adjacent to the first main surface and the second main surface. The first waveguide element 20 is provided on the first main surface and the second waveguide element 30 is provided so as to extend from the second main surface to the first lateral surface and the first main surface.

The power supply part 50 is provided on the first main surface, one end of which is electrically connected to the first waveguide element 20, the other end of which is electrically connected to the second waveguide element 30, and an IC chip 80 is mounted. The short circuiting part 60 is provided on the first main surface, one end of which is electrically connected to the first waveguide element 20 and the other end of which is electrically connected to the second waveguide element 30.

In the RF tag 100, the insulation base material 40 has a rectangular parallelepiped shape including long sides, short sides and a height.

The first lateral surface is a lateral surface on a short-side side of the insulation base material 40, and a notch 90 is formed on the first main surface from a center of the short side along a longitudinal direction of the rectangular parallelepiped, and the power supply part 50 and the short circuiting part 60 are separated by the notch 90.

Therefore, the power supply part 50 and the short circuiting part 60 are arranged parallel to each other from the first lateral surface along the longitudinal direction of the rectangular parallelepiped, and the first waveguide element 20 is adjacent to the power supply part 50 and the short circuiting part 60 in the longitudinal direction of the rectangular parallelepiped.

The reason that the notch 90 is formed on the first main surface from the center of the short side along the longitudinal direction of the rectangular parallelepiped and the power supply part 50 and the short circuiting part 60 are separated by the notch 90 is to ensure degrees of freedom in length and width of the power supply part 50 and the short circuiting part 60.

Various insulators and dielectrics can be used as the insulation base material 40, but use of Styrofoam having a small relative permittivity as the insulation base material 40 increases a distance between the first waveguide element 20 and the second waveguide element 30 with respect to the same capacitance, ensures an opening area of the antenna, and can thereby improve a gain of a planar inverted-F antenna.

In the RF tag 100 according to the present embodiment, the insulation base material 40, the first waveguide element 20, the second waveguide element 30, the power supply part 50 and the short circuiting part 60 constitute a planar inverted-F antenna. The RF tag 100 is provided with an inductance (L) constructed of the first waveguide element 20, the short circuiting part 60, the second waveguide element 30 and the power supply part 50 and a capacitance (C) that is the sum of a capacitance of a capacitor constructed of the first waveguide element 20, the second waveguide element 30 and the insulation base material 40 and an equivalent capacitance in the IC chip 80.

The inductance (L) and the capacitance (C) constitute a resonance circuit that resonates at a frequency (f) of a radio wave in the RF tag 100 where lengths of the power supply part 50 and the short circuiting part 60 are set so that the inductance (L) satisfies:

$$f = \frac{1}{2\pi\sqrt{LC}} \quad \text{[Equation 1]}$$

As shown in FIG. 1, the IC chip 80 is provided between the first waveguide element 20 and the power supply part 50. The IC chip 80 is disposed on a top surface (on the same plane as the plane of the first waveguide element 20) side of the insulation base material 40.

The IC chip 80 operates based on a radio wave received by the planar inverted-F antenna of the RF tag antenna 10. More specifically, the IC chip 80 first rectifies part of a carrier transmitted from a reading device and generates a supply voltage necessary for operation. The IC chip 80 causes a control logic circuit and a non-volatile memory storing product-specific information or the like in the IC chip 80 to operate on the generated supply voltage. Furthermore, the IC chip 80 causes a communication circuit or the like for transmission/reception of data to/from the reading device to operate.

Alternatively, an external power supply may be connected to the IC chip 80 so that the IC chip 80 operates on a voltage supplied from the external power supply.

Note that in the first embodiment, the second waveguide element 30 is provided so as to extend from the second main surface to the first lateral surface and the first main surface, and this is intended to facilitate a pasting operation by covering the first lateral surface not with the power supply part 50 and the short circuiting part 60, but with the second waveguide element 30. However, in the present invention, the power supply part 50 and the short circuiting part 60 may be extended to the first lateral surface and electrically connected to the second waveguide element 30 at a boundary between the first lateral surface and the second main surface.

In the first embodiment, as shown in FIG. 1 and FIG. 2, the first waveguide element 20, the second waveguide element 30, the power supply part 50 and the short circuiting part 60 are formed on an insulation sheet 70 and pasted to the insulation base material 40 via the sheet 70 folded at the side portions of the insulation base material 40. However, in the present invention, the first waveguide element 20, the second waveguide element 30, the power supply part 50 and the short circuiting part 60 need not always be formed on the sheet 70, and, for example, these elements may be formed as single units. Alternatively, these elements may be formed on the sheet 70, and after pasting the first waveguide element 20, the second waveguide element 30, the power supply part 50 and the short circuiting part 60 to the insulation base material 40 via the sheet 70, the sheet 70 may then be peeled off.

Conventionally, a total length A of the lateral sides of the first waveguide element 20 (corresponding to twice the total length of a lateral side 20a on the long-side side and a lateral side 20b on the short-side side) is preferably λ/2 (λ is a wavelength of a radio wave transmitted from the reading device), whereas in the present embodiment, the total length A of the lateral sides is set to 20% or more and 30% or less of the wavelength λ, that is, approximately half the conventional length of the lateral sides.

The IC chip 80 contains an equivalent capacitance inside. For this reason, when setting a resonance frequency of a resonance circuit, the equivalent capacitance inside the IC chip 80 is preferably taken into consideration. In other words, the resonance circuit preferably has a resonance frequency set by taking into consideration an inductance of an inductor pattern, a capacitance of a capacitor of the RF tag antenna 10 constructed of the first waveguide element 20, the second waveguide element 30 and the insulation base material 40 and an equivalent capacitance inside the IC chip 80.

When the capacitance of the capacitor of the RF tag antenna is $C_a$, the equivalent capacitance inside the IC chip is $C_b$, and the inductance of the inductor pattern is La, the resonance frequency f is given by Equation 2. Note that, for example, a capacitance value published as one of specifications of the IC chip used can be used as $C_b$.

$$f = \frac{1}{2\pi\sqrt{L_a \cdot (C_a + C_b)}} \quad \text{[Equation 2]}$$

Frequency characteristics in a readable range of the RF tag were measured using the RF tag 100 of the first embodiment. The measurement was conducted using Tagformance Ver.8.3.8 manufactured by voyantic with the second main surface of the RF tag 100 attached to a 105 mm×30 mm metal plate (SUS) using a double-sided tape. The attachment of the metal plate causes the metal plate and the second waveguide element 30 of the RF tag 100 to be connected via a capacitance of the double-sided tape, causes the metal plate to function as an extension of the second waveguide element 30 of the RF tag 100. The RF tag antenna 10 of the first embodiment becomes substantially equivalent to the RF tag antenna 10 with the second waveguide element 30 having a large area (105 mm×30 mm). The antenna gain can be improved by increasing the area of the second waveguide element 30 of the RF tag antenna 10 (corresponding to the ground section or the housing of the antenna).

FIG. 3 illustrates the measurement results.

According to FIG. 3, a readable range of 8.5 m to 9.0 m was obtained over a range of 910 MHz to 920 MHz. Note that the graph in FIG. 3 indicates theoretic values with Tagformance, and the actual communication performance varies depending on an external environment such as a pasting location, the reading device and antenna performance of the reading device.

(Verification with Simple Model)

A numerical analysis was made using a simple model in order to verify the ability to design a small and thin planar inverted-F antenna provided with a resonance frequency tuned to a reception frequency of a radio wave by providing the power supply part and the short circuiting part on the first main surface and setting the lengths of the power supply part and the short circuiting part so as to satisfy above-described Equation 1.

Figure 4:
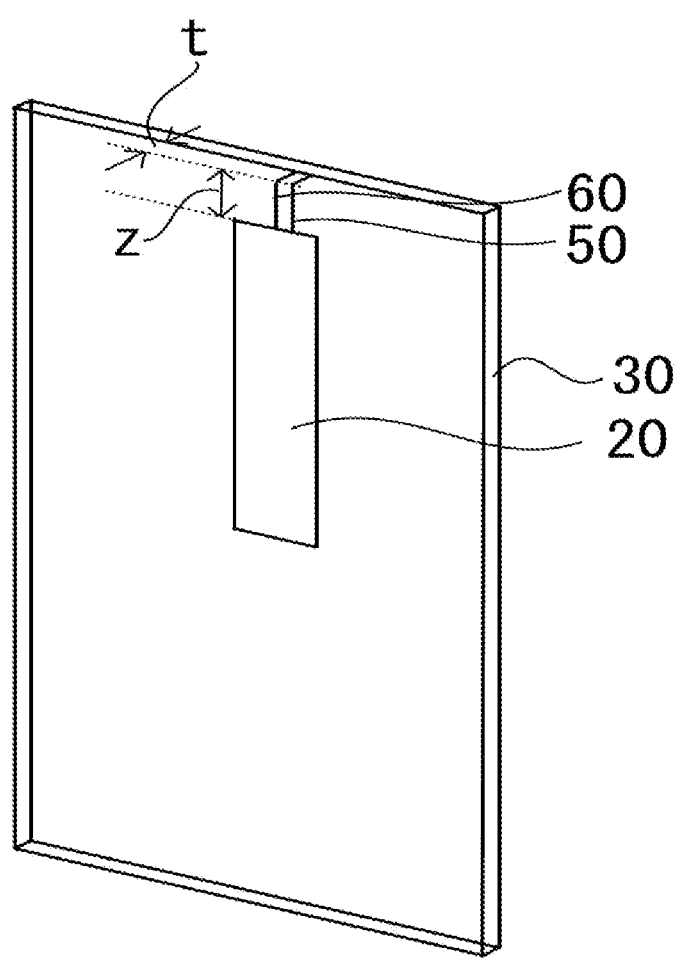
FIG. 4 is a schematic perspective view of a planar inverted-F antenna of a simple model.

FIG. 4 illustrates a schematic perspective view of a planar inverted-F antenna of a simple model used for the verification. The planar inverted-F antenna is provided with the first waveguide element 20, the second waveguide element 30, the power supply part 50 and the short circuiting part 60. However, in the simple model planar inverted-F antenna, the second waveguide element 30 is a conductor of 60 mm×120 mm and a thickness of 4 mm. That is, in the planar inverted-F antenna of the simple model, it is assumed that the metal plate is attached to the second waveguide element 30 as in the measurement of the first embodiment. The first waveguide element 20 is a rectangle having a width of 10 mm and a length of 32 mm and a distance t between the first waveguide element 20 and the second waveguide element 30 is 2 mm. A total length of 84 mm of the lateral sides of the first waveguide element 20 is approximately ¼ of a wavelength of 328 mm at a reception frequency of 915 MHz according to the first embodiment.

With the planar inverted-F antenna of the simple model, the power supply part 50 and the short circuiting part 60 are extended up to the first lateral surface and connected to the second waveguide element 30 at the boundary between the first lateral surface and the second main surface. A space between the first waveguide element 20 and the second waveguide element 30 is filled with a substance (e.g., air) having relative permittivity 1.

The verification on the planar inverted-F antenna of the simple model was conducted using an FDTD method (Finite-difference time-domain method), by finding a frequency at which an input impedance of the antenna becomes maximum (RinMAX_F) and a frequency at which reflection loss becomes minimum (LossMIN_F) in case the distance z between the first lateral surface and the first waveguide element 20 is varied.

Figure 5:
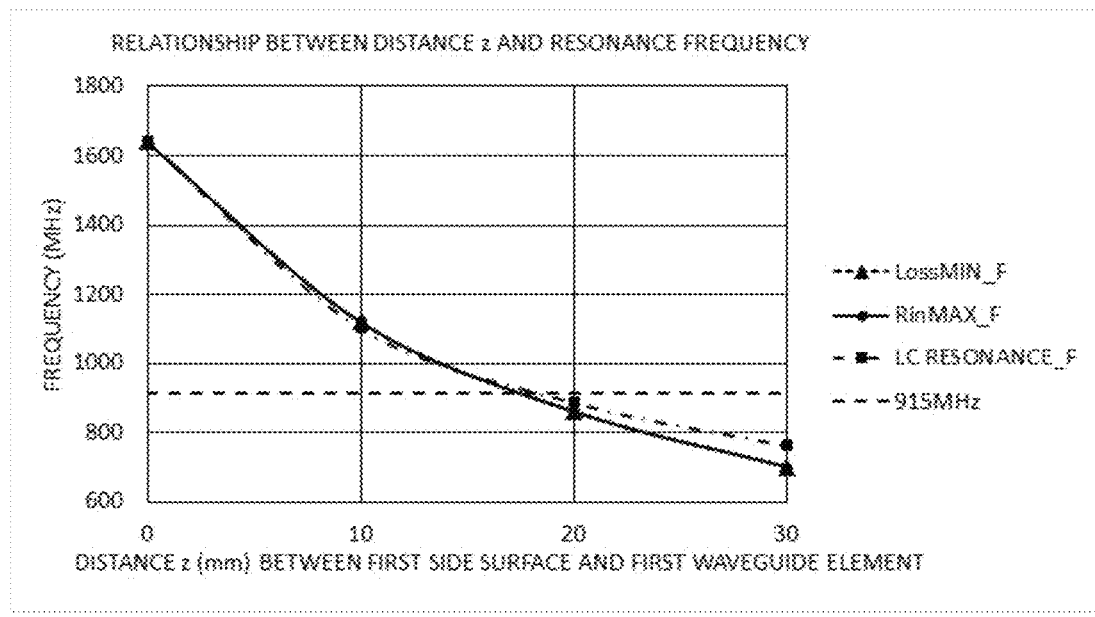
FIG. 5 is a graph illustrating analysis results of the planar inverted-F antenna of the simple model using an FDTD method.

FIG. 5 illustrates the analysis results using the FDTD method.

In FIG. 5, LC resonance frequency (LC resonance_F) is also plotted, which is calculated by using Equation 1, from an inductance L which is the sum of an inductance at z=0 and the product of an inductance per unit length and the length z, and the capacitance C calculated from the area of the first waveguide element 20 and the distance between the first waveguide element 20 and the second waveguide element 30.

However, in the calculation of the LC resonance frequency (LC resonance_F) in FIG. 5, the value of L which is calculated back from the resonance frequency obtained using the FDTD method at z=0 was used for the inductance at z=0, and a value calculated separately using the FDTD method was used for the inductance per unit length. A signal source impedance of the power supply circuit was set to 1 kΩ with reference to the actual output impedance of the IC chip 80.

According to FIG. 5, it is seen that RinMAX_F, LossMIN_F and LC resonance_F substantially match and it is possible to find the inductance L (and length z) to obtain the resonance frequency f by inputting the resonance frequency f that matches the reception frequency of a radio wave and the capacitance C to Equation 1.

Conventionally, regarding the shape of the planar inverted-F antenna, the total length A of the lateral sides needed to be set to (½)λ, where the wavelength corresponding to the reception frequency is assumed to be λ. When the reception frequency is 915 MHz, λ is 328 mm, and so the shape of the second waveguide element has, for example, a width of 10 mm and a length of 72 mm.

On the other hand, according to FIG. 5, when reception frequency f=915 MHz, z=15 mm and the shape combining the first waveguide element of 32 mm×10 mm and the distance z=15 mm is 47 mm×10 mm, and so adopting the present invention makes it possible to shorten the length of the RF tag antenna by 25 mm.

Note that the verification using the above-described simple model was done just to verify the effects of the present invention and in designing the actual RF tag antenna, it is necessary to determine the shapes (lengths and widths) of the first waveguide element, the power supply part and the short circuiting part or the like and the thickness of the insulation base material or the like with the output impedance (resistance component and equivalent capacitance) of the IC chip, necessary reception frequency bandwidth, relative permittivity of the insulation base material or the like taken into consideration.

Second Embodiment

The RF tag 100 according to a second embodiment will be described using FIG. 6, which is a schematic cross-sectional view of the RF tag 100.

Figure 6:
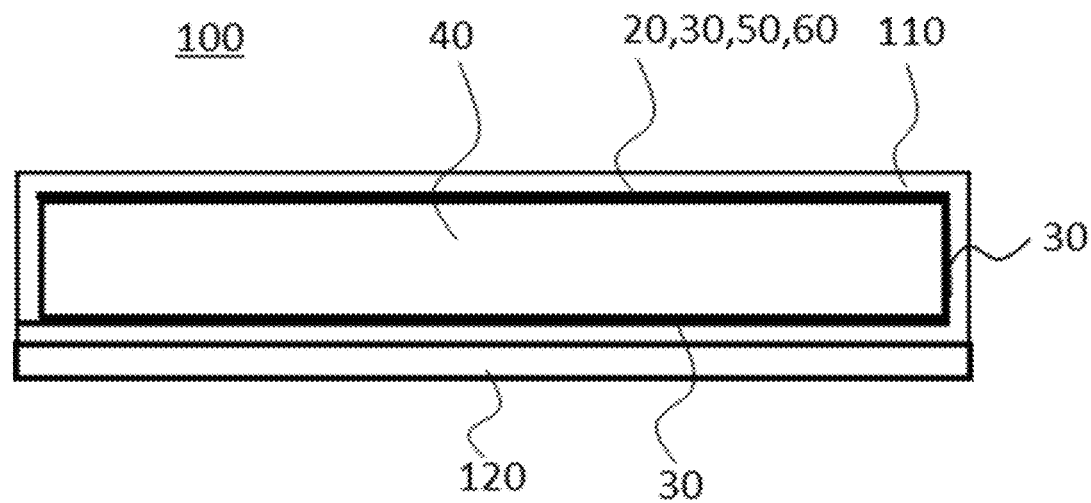
FIG. 6 is a schematic cross-sectional view of an RF tag of a second embodiment.

The RF tag 100 in FIG. 6 provides a protection and printing sheet 110 on the surfaces of the first waveguide element 20, the second waveguide element 30, the insulation base material 40, the power supply part 50 and the short circuiting part 60 of the RF tag 100 of the first embodiment and further provides a double-sided tape 120 on the surface of the protection and printing sheet 110 of the second main surface.

The protection and printing sheet 110 is preferably obtained by wrapping a foamed sheet having a thickness of approximately 0.1 mm around the surface of the RF tag antenna 10. As the double-sided tape 120, for example, a double-sided tape having a thickness of 0.1 mm is preferably used. Note that in the case of the present embodiment, the thickness of the body of the RF tag antenna 10 ranges from 1.2 mm to 1.3 mm.

Since the RF tag 100 of the present embodiment is provided with the double-sided tape 120, the RF tag 100 can be easily attached to the conductor. Moreover, the RF tag 100 is inexpensive because no material or step for the exterior is required. However, since it is not waterproof, use of the RF tag 100 is limited to indoor use.

Third Embodiment

The RF tag 100 according to a third embodiment will be described using FIG. 7, which is a schematic cross-sectional view of the RF tag 100.

Figure 7:
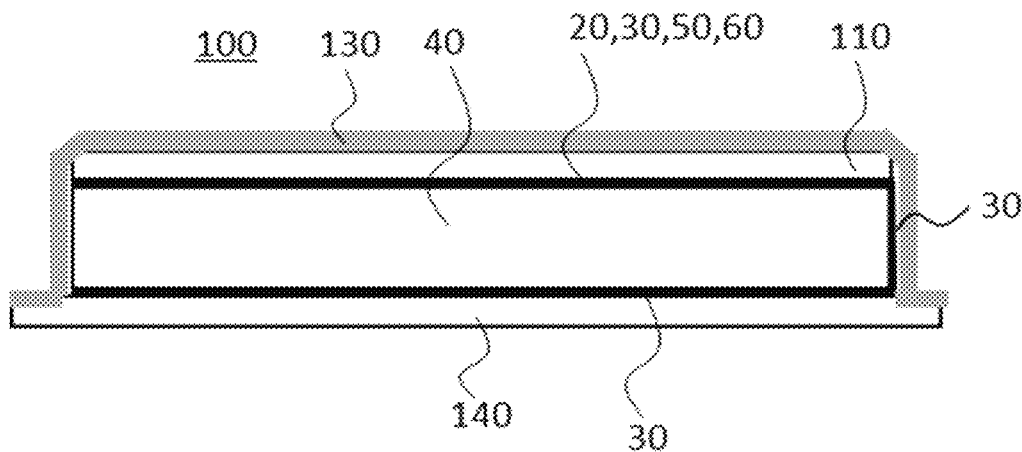
FIG. 7 is a schematic cross-sectional view of an RF tag of a third embodiment.

The RF tag 100 in FIG. 7 provides the protection and printing sheet 110 on the surfaces of the first waveguide element 20, the power supply part 50, the short circuiting part 60 and (part of) the second waveguide element 30, which are disposed on the first main surface of the RF tag 100 of the first embodiment, provides an exterior sheet 130 on the surface of the protection and printing sheet 110 of the first main surface and each lateral surface of the insulation base material 40, and further provides one-sided adhesive tape 140 on the surface of the second waveguide element 30 of the second main surface.

For example, a foamed sheet having a thickness of approximately 0.1 mm is preferably used for the protection and printing sheet 110. For example, a vinyl chloride sheet having a thickness of approximately 0.2 mm is preferably used for the exterior sheet 130. For example, a one-sided adhesive tape of vinyl chloride base material of strong adhesion specification having a thickness of approximately 0.1 mm is preferably welded using a welder for the one-sided adhesive tape 140. Note that in the case of the present embodiment, the thickness of the body of the RF tag antenna 10 also ranges from 1.2 mm to 1.3 mm.

Since the RF tag 100 of the present embodiment is provided with the one-sided adhesive tape 140, it can be easily attached to the conductor. Furthermore, since the top surface and the lateral surface of the RF tag antenna 10 are covered with a vinyl chloride sheet, the RF tag antenna 10 is provided with a certain level of waterproof function.

Fourth Embodiment

The RF tag 100 according to a fourth embodiment will be described using FIG. 8, which is a schematic cross-sectional view of the RF tag 100.

Figure 8:
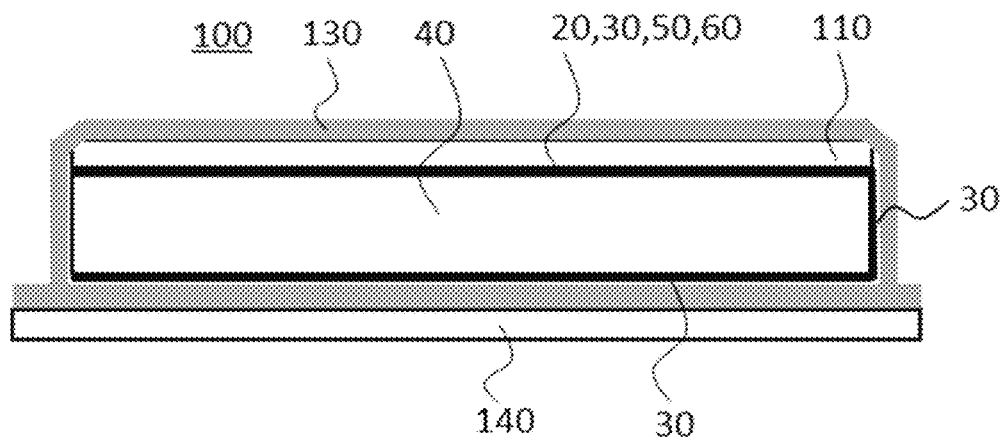
FIG. 8 is a schematic cross-sectional view of an RF tag of a fourth embodiment.

The RF tag 100 in FIG. 8 provides the protection and printing sheet 110 on the surfaces of the first waveguide element 20, the power supply part 50, the short circuiting part 60 and (part of) the second waveguide element 30 disposed on the first main surface of the RF tag 100 of the first embodiment, provides the exterior sheet 130 on the surface of the protection and printing sheet 110 of the first main surface, each lateral surface of the insulation base material 40 and the surface of the second waveguide element 30 of the second main surface, and further provides a one-sided adhesive tape 140 on the surface of the exterior sheet 130 of the second main surface.

For example, a foamed sheet having a thickness of approximately 0.1 mm is preferably used for the protection and printing sheet 110. For example, a highly weather resistant vinyl chloride sheet (tough sheet) having a thickness of approximately 0.3 mm is preferably welded using a welder for the exterior sheet 130. For example, a one-sided adhesive tape of vinyl chloride base material of strong adhesion specification having a thickness of approximately 0.1 mm is preferably used for the one-sided adhesive tape 140. Note that in the present embodiment, the thickness of the body of the RF tag antenna 10 also ranges from 1.2 mm to 1.3 mm.

The RF tag 100 of the present embodiment is provided with the one-sided adhesive tape 140, and so it can be easily attached to the conductor. Moreover, since the top surface, the lateral surface and the bottom surface of the RF tag antenna 10 are covered with a highly weather resistant vinyl chloride sheet, the RF tag antenna 10 is provided with strong waterproof and weather resistant functions.

Fifth Embodiment

An RF tag-equipped conductor 150 according to a fifth embodiment will be described using FIG. 9, which is a schematic perspective view of the RF tag-equipped conductor 150.

Figure 9:
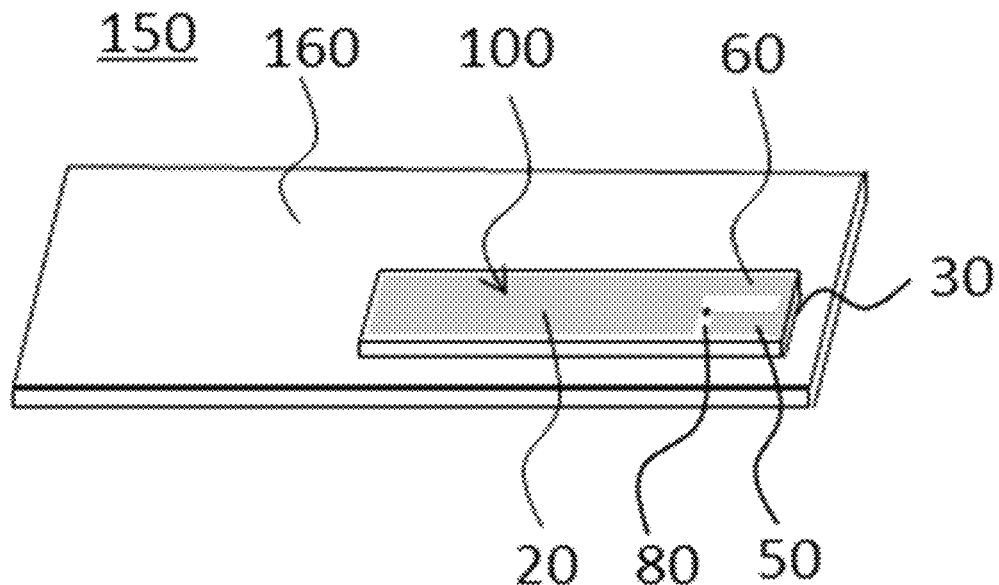
FIG. 9 is a schematic perspective view of an RF tag-equipped conductor of a fifth embodiment.

The RF tag-equipped conductor 150 in FIG. 9 is constructed of the RF tag 100 according to the second to fourth embodiments attached to a conductor 160 via the double-sided tape 120 or the one-sided adhesive tape 140 provided for the RF tag. The RF tag 100 is preferably disposed so that the power supply part 50 is located close to an end portion of the conductor 160.

In the RF tag-equipped conductor 150, the second waveguide element 30 of the RF tag antenna 10 and the conductor 160 are connected to each other via a capacitance of the double-sided tape 120 or the one-sided adhesive tape 140 or the like, and so the RF tag-equipped conductor 150 substantially constitutes a planar inverted-F antenna with the area of the second waveguide element 30 extended to the area of the conductor 160, making it possible to improve the antenna gain.

The ability to improve the antenna gain by expanding the area of the second waveguide element 30 (corresponding to the housing) is a well-known technology as described, for example, in SAWS (magazine name) issued on Apr. 3, 2000 and vol. 9 issued on Apr. 3, 2000 (issued by Kikusui Electronics Corp., Sales Planning Department) stating "although the flat, small planar inverted-F antenna originally has a narrowband characteristic (fractional bandwidth 1% to 2%), when the antenna is disposed in the housing, the band expands and a wideband (maximum 17%) necessary for a mobile phone is achieved. The gain is also improved at the same time."

In the present invention, the RF tag antenna 10 corresponds to an "RF tag antenna," the IC chip 80 corresponds to an "IC chip," the RF tag 100 corresponds to an "RF tag," the insulation base material 40 corresponds to an "insulation base material," the first waveguide element 20 corresponds to a "first waveguide element," the second waveguide element 30 corresponds to a "second waveguide element," the power supply part 50 corresponds to a "power supply part," the short circuiting part 60 corresponds to a "short circuiting part," the notch 90 corresponds to a "notch," the protection and printing sheet 110 corresponds to a "protection and printing sheet," the double-sided tape 120 or the one-sided adhesive tape 140 corresponds to an "adhesive sheet," the exterior sheet 130 corresponds to an "exterior sheet", the RF tag-equipped conductor 150 corresponds to an "RF tag-equipped conductor," and the conductor 160 corresponds to a "conductor."

REFERENCE SIGNS LIST

10 RF tag antenna
20 first waveguide element
30 second waveguide element
40 insulation base material
50 power supply part
60 short circuiting part
80 IC chip
90 notch
100 RF tag
110 protection and printing sheet
120 double-sided tape
130 exterior sheet
140 one-sided adhesive tape
150 RF tag-equipped conductor
160 conductor

What is claimed is:

1. An RF tag comprising:
an RF tag antenna; and
an IC chip that operates based on a radio wave,
the RF tag antenna comprising:
an insulation base material having a first main surface, a second main surface facing the first main surface, a first lateral surface adjacent to the first main surface and the second main surface;
a first waveguide element provided on the first main surface;
a second waveguide element provided so as to extend from the second main surface to the first lateral surface and the first main surface;
a power supply part provided on the first main surface, one end of which is electrically connected to the first waveguide element and the other end of which is electrically connected to the second waveguide element and mounted with the IC chip; and a short circuiting part provided on the first main surface, one end of which is electrically connected to the first waveguide element and the other end of which is electrically connected to the second waveguide element, wherein the insulation base material, the first waveguide element, the second waveguide element, the power supply part and the short circuiting part constitute a planar inverted-F antenna that receives the radio wave transmitted from a reading device, the total length of lateral sides of the first waveguide element is 20% or more and 30% or less of a wavelength ($\lambda$) of the radio wave, and an inductance (L) constructed of the first waveguide element, the short circuiting part, the second waveguide element and the power supply part, and a capacitance (C) that is the sum of a capacitance of a capacitor constructed of the first waveguide element, the second waveguide element and the insulation base material and an equivalent capacitance in the IC chip, constitute a resonance circuit that resonates at a frequency (f) of the radio wave, and the lengths of the power supply part and the short circuiting part are set so that the inductance (L) satisfies:

$$f = \frac{1}{2\pi\sqrt{LC}}.$$ [Equation 1]

2. The RF tag according to claim 1, wherein the insulation base material has a rectangular parallelepiped shape having long sides, short sides and a height, the first lateral surface is a lateral surface of the insulation base material on a short-side side, a notch is formed on the first main surface from the center of the short side along a longitudinal direction of the rectangular parallelepiped, and the power supply part and the short circuiting part are separated by the notch.

3. The RF tag according to claim 1, wherein the raw material of the insulation base material is Styrofoam.

4. The RF tag according to claim 1, wherein
a protection and printing sheet is provided on the surfaces of the first waveguide element, the second waveguide element, the power supply part and the short circuiting part, and
further, an adhesive sheet is provided on the surface of the protection and printing sheet of the second main surface.

5. The RF tag according to claim 1, wherein
a protection and printing sheet is provided on the surfaces of the first waveguide element, the power supply part, and the short circuiting part of the first main surface,
an exterior sheet is provided on the surface of the protection and printing sheet of the first main surface and each lateral surface of the insulation base material, and
further, an adhesive sheet is provided on the surface of the second waveguide element of the second main surface.

6. The RF tag according to claim 1, wherein
a protection and printing sheet is provided on the surfaces of the first waveguide element, the power supply part and the short circuiting part of the first main surface,
an exterior sheet is provided on the surface of the protection and printing sheet of the first main surface, each lateral surface of the insulation base material and the surface of the second waveguide element of the second main surface, and
further, an adhesive sheet is provided on the surface of the exterior sheet of the second main surface.

7. An RF tag-equipped conductor comprising:
a conductor; and
the RF tag according to claim 4, wherein
the conductor is attached to the RF tag via the adhesive sheet of the RF tag.

* * * * *